A. T. De PUY.
Printers' Galley.
No. 6,326.
Reissued March 9, 1875.
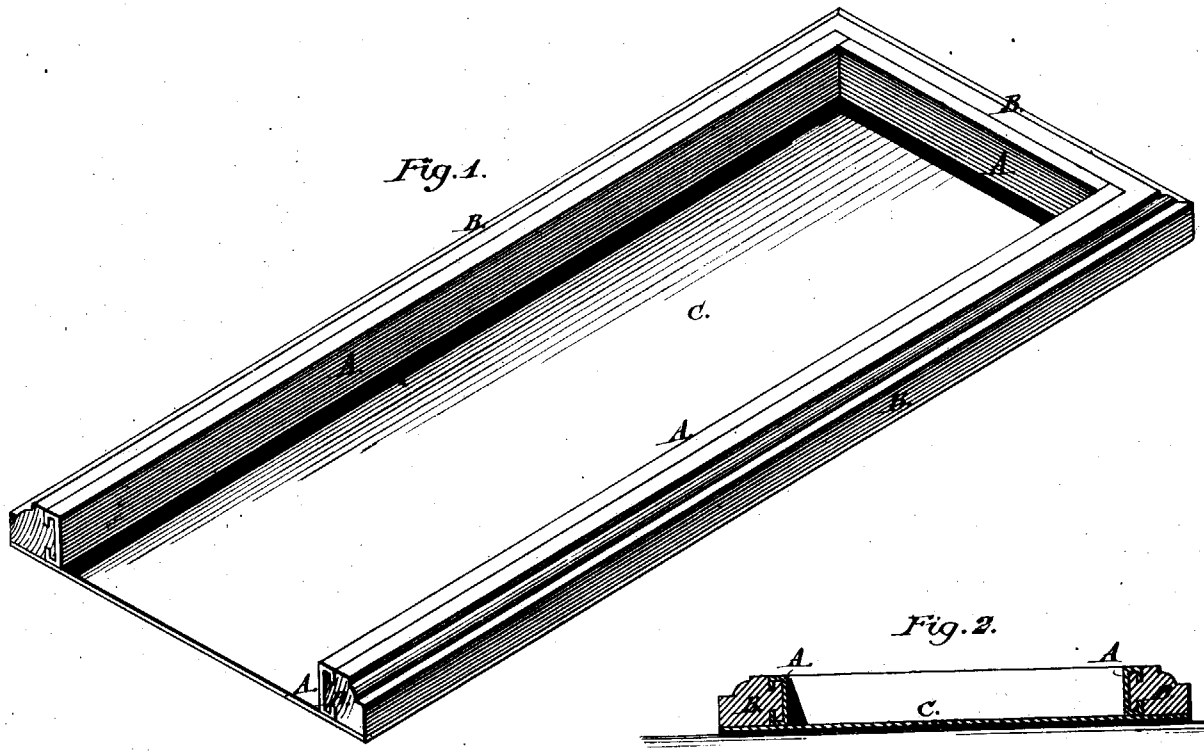
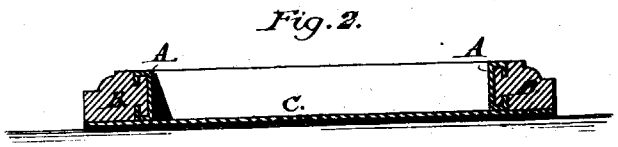
Witnesses:
Chas. H. Carpenter
N. Walter Anthony
Inventor:
Alexander T. De Puy.
R. Hoe & Co. Assignees.
THE GRAPHIC CO. PHOTO-LITH. 39 & 41 PARK PLACE, N.Y.

UNITED STATES PATENT OFFICE.

ALEXANDER T. DE PUY, OF NEW YORK, N. Y., ASSIGNOR TO R. HOE & CO., OF SAME PLACE.

IMPROVEMENT IN PRINTERS' GALLEYS.

Specification forming part of Letters Patent No. 60,151, dated December 4, 1866; reissue No. 3,066, dated August 4, 1868; reissue No. 6,326, dated March 9, 1875; application filed February 25, 1875.

CASE A.

*To all whom it may concern:*

Be it known that ALEXANDER T. DE PUY, of the city, county, and State of New York, invented certain Improvements in Printers' Galleys, of which the following is a specification:

In the accompanying drawings forming part of this specification, Figure 1 is a perspective view; Fig. 2, a sectional view.

Similar letters of reference indicate like parts in both figures.

The object of this invention is to so attach the metallic strips of lining which protect the wooden side and end ledges or rails forming the frame of a printer's galley to said wooden ledges or rails in such a manner that they may be firmly secured without any fastening, which shall extend through the inner face of the said metallic strips, as will be more particularly herein set forth; and the invention further consists in a facing or lining strip of metal, so fastened to the inner or face side of the wooden ledge or rail of the galley that the means of securement shall not require the perforation of the said facing-strip, whereby its surface remains smooth and unbroken, and hence will not upset, cant, or otherwise disturb the composed type-matter it is made to contain.

One form of the invention consists in providing the said metallic strip or lining with a flange or flanges, which may be forced into a groove or grooves cut into the wooden ledge or rail, and thus be kept secured to them without any other fastening. Heretofore the metallic lining-strips have been attached to the wooden ledge or rail of the galley by means of screws or nails, which extend through the metallic strip from the inner or face side, their heads being countersunk in the metallic strip; but in such construction the screws or nails soon loose their firm hold in the wooden ledge or rail and protrude beyond the face of the lining-strip, and so interfere with the type as to throw it out of justification. Moreover, the metal strip is thus loosened, and becomes irregular and shaky, and the heads of the screws or nails can never be so accurately fitted as to form a smooth surface or unbroken plane with the face of the metal strip, as they either project a little beyond or sink within the said plane or surface, all of which are very great disadvantages, as the metal strips are supplied merely for the purpose of giving a more smooth inner surface to the galley than the wooden ledge alone will do.

All of these disadvantages are completely overcome by this invention, which supplies the desirable metallic inner lining or facing to the wooden ledge of the galley, which is so fastened to the said ledge that the metal surface presented to the type is a smooth, unbroken one, which can in no wise disturb the perfect position of justification in which the types must be sustained. It is obvious that this invention may be embodied in various forms without departing from the gist or spirit of it. One form which has been found advantageous, by reason of the cheapness of its construction, is fully shown in the drawings, and will now be particularly described.

The top and bottom edges of the metallic lining or facing strips are bent twice at right angles, so that the last bend is parallel to the main body of the plate, as seen in Fig. 2. Grooves are then cut into the top and bottom of the wooden ledges B, so that the last bend of the strip may fit into said grooves. The strip A having been thus bent, and the grooves having been cut into the ledge B, the former is forced into the latter, when the whole ledge or rail is ready to be attached to the bottom plate C of the galley.

In this way one is enabled to construct the ledges or rails in long pieces, and, by cutting them into the requisite lengths when finished, obtain a very cheap and effective ledge or rail for printers' galleys. The whole length of the metallic strips holding into the wooden ledge at its top or bottom gives a very secure fastening. The ledges B may be attached to the bed-plate C in any well-known manner.

It is apparent that other forms of the flange uniting the metallic facing-strip to the wooden ledge, and a corresponding groove or grooves in the wood to receive the flange, may be made to attain the same end, viz., to fasten the metal facing-strip to the wooden ledge or rail without screws, nails, or other device which shall protrude to the face side of the said metal strip, and still be within the scope of this invention. Therefore,

What is claimed as the invention of ALEXANDER T. DE PUY is—

1. In a printer's galley, the combination of the edge-rail and its metallic facing or lining by means which secure their union and leave the metallic facing or lining smooth, or free from perforations or similar interruptions, substantially as and for the purpose set forth.

2. The metallic facing or lining of the edge-rail or ledge of a printer's galley, secured thereto by means of a flange or flanges, so that the point of securement shall be in rear of the face, thus leaving the latter smooth or uninterrupted by any fastening device.

3. An edge-rail for a printer's galley, having a metallic facing secured thereto behind the plane of its face, substantially as described, and for the purpose set forth.

R. HOE & CO.

Witnesses:
CHAS. W. CARPENTER,
N. WALTER ANTHONY.